March 26, 1940. G. A. TITTERINGTON, JR 2,194,624
DIAPHRAGM PRESSURE GAUGE HAVING TEMPERATURE COMPENSATING MEANS
Filed May 21, 1937 2 Sheets-Sheet 1
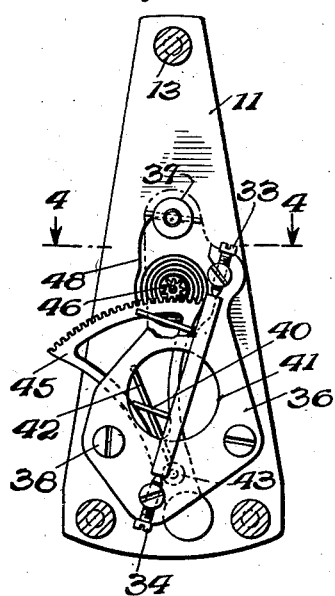
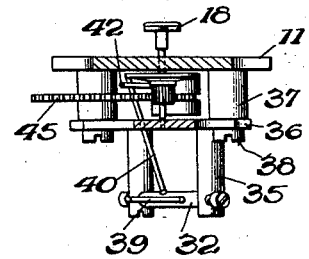
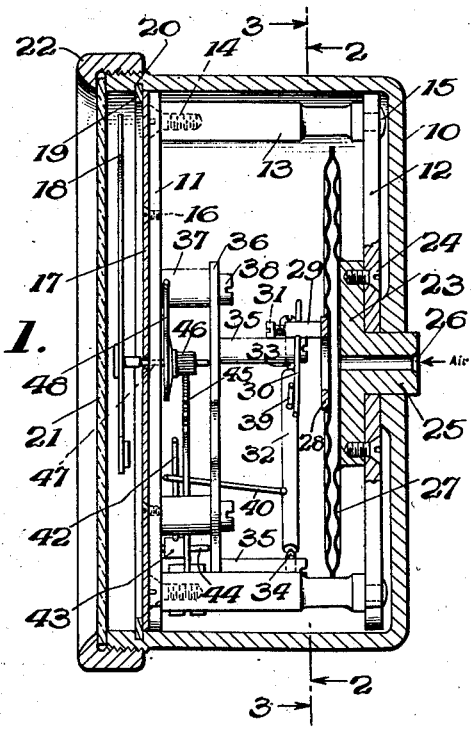
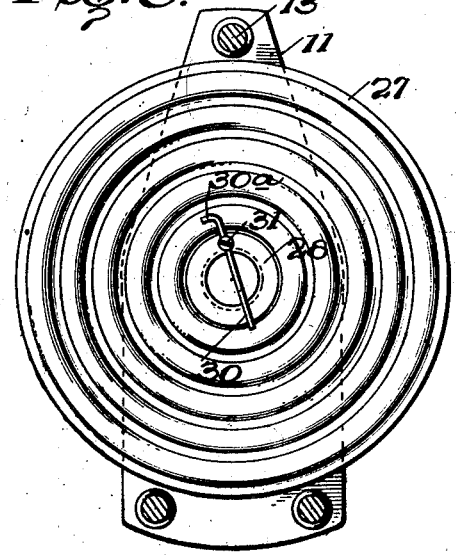
INVENTOR
GEORGE A. ITTERINGTON, JR.
BY
Stephen Cerstvik
ATTORNEY March 26, 1940.  G. A. TITTERINGTON, JR  2,194,624
DIAPHRAGM PRESSURE GAUGE HAVING TEMPERATURE COMPENSATING MEANS Filed May 21, 1937   2 Sheets-Sheet 2

INVENTOR
GEORGE A. TITTERINGTON, JR.
BY
Stephen Cerstvik
ATTORNEY

Patented Mar. 26, 1940

2,194,624

UNITED STATES PATENT OFFICE 2,194,624

DIAPHRAGM PRESSURE GAUGE HAVING TEMPERATURE COMPENSATING MEANS

George A. Titterington, Jr., Austin, Tex., assignor to Bendix Aviation Corporation, South Bend, Ind., a corporation of Delaware Application May 21, 1937, Serial No. 144,104

7 Claims. (Cl. 73—110)

The present invention relates to compensating means and more particularly to means for compensating for the effect of temperature upon a spring, diaphragm element or the like, and to compensate for temperature errors due to different rates of expansion of the spring or diaphragm element over different parts of the scale of the instrument with which the element is used.

More specifically, the device embodying the invention is provided for the purpose of compensating temperature errors and errors due to unequal expansion at different parts of the scale by providing a correction characteristic that will practically eliminate the error characteristic of the instrument to which the device is applied.

Instruments utilizing expansible or resilient elements as their actuating means are subject to various sources of error. There may be a differential expansion of different parts of the mechanism which either produces errors directly, or, by distorting the elements of the device, prevents its accurate operation. These errors may partly arise in the expansible element and may be corrected or eliminated by the present invention.

Upon a change in temperature, the elastic modulus of the material used in the expanding or resilient element, which may be for instance a diaphragm, changes, thereby changing the spring effect. Errors arise, which vary not only with changes in temperature but also with the extent of the deflection of the spring or diaphragm or, in other words, the errors vary with both the temperature and the particular part of the scale upon which the instrument is operating, with the zero error anywhere on the scale or outside of it.

Similar devices of the prior art have provided means whereby the errors due to changes in temperature may be compensated. This, however, has not eliminated or compensated the errors which vary with the extent of the deflection of the spring or diaphragm. Further, errors may occur over a part of a scale only and similar devices of the prior art have merely provided means which add or subtract the same correction from each point of the entire scale. These devices are not capable, therefore, of limiting their correction to only that part of the scale over which the errors occur. In fact, the previous devices merely distribute the errors but do not correct them.

Accordingly, one of the objects of the present invention is to provide a novel means whereby the foregoing undesirable characteristics are eliminated.

Another object of the invention is to provide a novel means whereby the compensation applied to the instrument varies in proper amounts at different parts of the scale.

Still another object of the invention is to so change the amplification ratio of the mechanism as to provide a variable correction that varies both with the temperature and with the scale reading and is also adjustable so that it can be applied over only that part of the scale in which the errors occur.

A further object is to provide compensation that varies with changes in temperature, and means for adjusting the operation of such compensation whereby the correction curve of the compensator can be made to combine with the error curve of the instrument to thereby eliminate the errors.

In the device of the present invention the component of the total deflection that is in the direction of the spring or diaphragm deflection is not merely varied but the magnification ratio which varies with the rotation of the rockshaft or in other words over different parts of the scale is varied.

The above and further objects and advantages of the invention will appear more fully hereinafter, from a consideration of the detailed description which follows, taken together with the accompanying drawings wherein is illustrated one embodiment of the invention. It is to be expressly understood, however, that the drawings are for the purpose of illustration and description only and are not designed as a definition of the limits of the invention, reference being had for this purpose to the appended claims.

While the novel device is herein described as applied to a pressure gauge, it is to be expressly understood that the application is not to be so limited but that said device may be applied wherever a resilient actuating mechanism is utilized to produce the motivating force in an instrument.

In the drawings wherein like reference characters refer to like parts throughout the several views:

Fig. 1 is a side elevation partly in section illustrating one embodiment of the invention;

Fig. 2 is a section taken along the line 2—2 of Fig. 1 with the thermo-element omitted for clarity;

Fig. 3 is a section taken along the line 3—3 of

Figure 5:
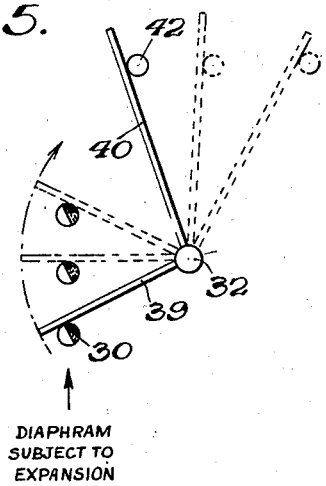
Figure 6:
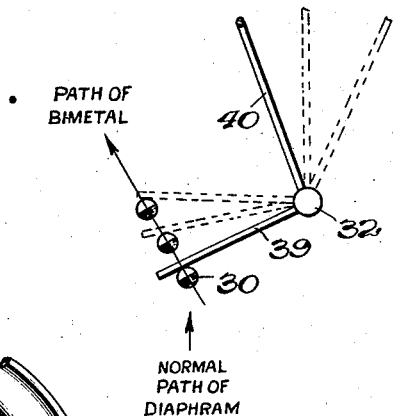
Figure 7:
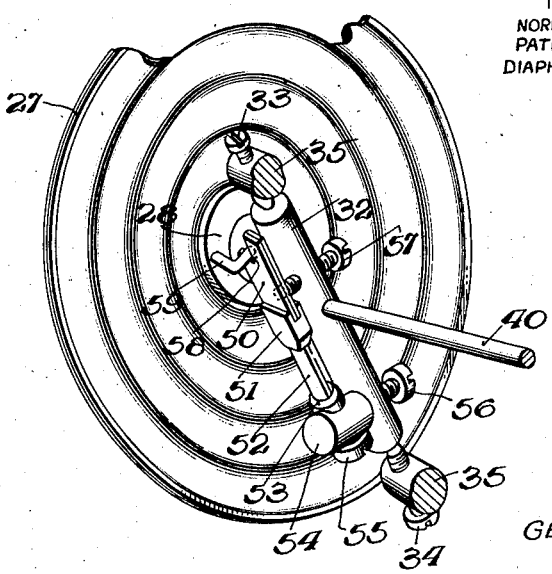

Fig. 1 and illustrating the mounting of the thermo-actuated compensator element;

Fig. 4 is a section taken along the line 4—4 of Fig. 2;

Fig. 5 is a diagram illustrating the theory of operation of the compensator under one set of conditions;

Fig. 6 is a diagram further illustrating the theory of operation of the compensator under a different set of conditions; and Fig. 7 is an enlarged perspective view illustrating another embodiment of the invention.

Referring to the drawings and more particularly to Fig. 1, a compensator in the form of a bi-metal wire is shown as applied to an indicating instrument which, in the present instance, is illustrated as a pressure gauge. Said gauge comprises a casing 10 enclosing a frame including a front plate 11 connected to a back plate 12 by spacing rods 13 held in place by screws 14 and rivets 15 in the front and back plates, respectively. Mounted on said front plate 11 by screws 16 is a dial 17 over which moves a pointer 18. The entire frame is held in position by a resilient split snap ring 19 located in slot 20 in the interior of casing 10. A cover glass 21 held in place by the screw clamping ring 22 seals the front end of the instrument.

The back plate 12 is mounted on the base 23 by screws 24, the hub 25 of said base projecting through the casing 10 and being provided with a central opening 26 leading to the source of pressure.

Mounted on said base 23 is diaphragm 27 made of metal or some other expansible material, the interior of the diaphragm leading to the opening 26 whereby pressure is exerted upon the interior of said diaphragm. Mounted at the center part of said diaphragm is a metal ring 28 carrying the center post 29 in which is adjustably mounted the means embodying the present invention and shown in the form of a bi-metal rod 30 provided with an adjusting lever 30a (see Fig. 3) integral therewith. The rod may be composed of a strip of brass half rounded and welded to a similar strip of "Invar" at the flat surface thereof. Upon a change in temperature the rod will bend in a manner well understood in the art. Said rod is adjustably mounted in an opening in the center post 29 and is held in position after adjustment by screw 31 fitting into a tapped opening in post 29. The bi-metal rod is mounted parallel to rockshaft 32 which shaft is mounted in pivots 33 and 34 for rotation thereon. Said pivots are mounted in posts 35 on plate 36 which, in turn, is mounted on plate 11 by posts 37 and screws 38.

Connected to said rockshaft and extending therefrom to contact the bi-metal rod, is a short rod 39 whereby the movement of the diaphragm and bi-metal rod 30 is transmitted into rotative movement of the rockshaft. Also mounted on said rockshaft and extending therefrom is a relatively long lever 40 passing through an opening 41 in plate 36 (see Fig. 2) and contacting a rod 42 extending from a collar 43 on shaft 44 journaled in front plate 11 and plate 36. Connected to the collar 43 and rotatable therewith is a sector 45 meshing with pinion 46 on shaft 47 at the end of which is mounted pointer 18. Also connected to said shaft 47 at one end thereof is a spring 48 the other end of which is connected to post 37, said spring serving to urge the pointer 18 to zero position. The lever 40 may be bent in order to adjust the original magnification ratio.

The operation of the instrument is as follows:

Upon an increase in the quantity to be indicated, in the present case pressure, the diaphragm 27 expands, thereby moving center post 29 to the left, as viewed in Fig. 1, and also moving the bi-metallic rod 30 laterally in the same direction. Rod 30, through its contact with rod 39 connected to rockshaft 32, translates the linear movement of the diaphragm into rotary movement of rockshaft 32. Upon rotation of rockshaft 32, the relatively long lever 40 is moved and through its contact with rod 42 rotates collar 43 on shaft 44 to rotate sector 45 which, in turn, rotates pinion 46 and shaft 47 to move the pointer 18 over scale 17 to thereby indicate the pressure desired.

Upon changes in temperature the diaphragm 27 changes its modulus of elasticity whereby a pressure of certain incremental value will actuate the diaphragm to a different extent than would the same incremental value of pressure at a different temperature. This causes an erroneous indication of pointer 18, which indication also varies at different points of the scale, which correspond to a different degree of expansion of the diaphragm 27.

The novel means of compensating these errors will now be described.

Referring to Fig. 5, there is shown a diagrammatic illustration of the movement of the bi-metal rod when actuated solely by movement of the diaphragm with no change in temperature. As the diaphragm moves upwardly, as viewed in Fig. 5, the bi-metal rod also moves laterally upward, at the same time rotating the short rod 39. As the rod 39 and the rockshaft are rotated it is clear from Fig. 5, that the lever arm, namely the distance along the rod 39 from the point of contact of bi-metal rod 30 to the center of rockshaft 32 changes. Therefore, for the same increment of movement by the diaphragm the incremental indication at different parts of the scale will differ.

In Fig. 6 is shown a diagrammatic illustration of the movement of the bi-metal rod when the diaphragm is maintained in one position and the temperature is varied. As shown in Fig. 6, the bi-metal rod has been rotated 90° from its position in Fig. 5 by its lever 30a the effect of which will be indicated more in detail later. In Fig. 6, upon an increase in temperature the bi-metal rod expands to successive positions, which, in the case illustrated, not only changes the lever arm of the force supplied but also actuates the short rod 39 to rotate the rockshaft 32. By comparing Figs. 5 and 6 and noting particularly the rotative angular position of the bi-metal rod, it will be seen that by rotating said bi-metal rod, by means of its lever 30a, the rate of change, of the lever arm of the force applied along 39 and the amount of movement of rod 39 may be varied.

It has been found in actual tests that by varying the rotative position of rod 30, the compensation curve of the compensator can be made to balance exactly, within practical allowable limits, the error curve of the instrument even when said errors are limited to only a part of the scale. By proper choice of the effective length, cross-section and material of the bi-metal strip, by mounting it parallel to the rockshaft, and by rotating said bi-metal rod to different positions by means of its lever 30a, the magnitude of the ratio change can be determined and the correction curve of the compensator made to combine with the error curve of the instrument to thereby compensate for all errors due to temperature changes and at different parts of the scale, corresponding to different degrees of expansion of the diaphragm.

Stated in another manner, it may be said that the bi-metal rod is so chosen in effective length, thickness and material, as to determine the magnitude of ratio change of lever arm ratio to provide compensation, and is located with respect to the other elements so that change of lever arm occurs with changes in temperature and by rotating the bi-metal rod by means of its lever 30a and setting the rod in position by screw 31, the plane of its expansion upon changes in temperature can be varied with respect to the plane of the deflection under the influence of the diaphragm, so that the correction curve can be made to combine with the error curve of the instrument throughout its scale.

In Fig. 7 is shown another embodiment of the invention which embodiment may be obviously utilized in the instrument as illustrated in Fig. 1. As shown, the bi-metal element is made in the form of a strip 50 composed of two layers of dissimilar materials fastened together and secured to a holder 51 carried by resilient element 52 which in turn is held by threaded rod 53 for rotation in post 54 by screw 55. Set screw 56 may be used to hold the rod 53 in place after it has been rotated to the position desired in which case the threads on 53 and in 54 may be eliminated or a saw cut may be made through the screw thread inside element 54 to hold 53 in adjusted position. On one side of rockshaft 32, as viewed in Fig. 7 and extending therethrough, is the ranging screw 57 whose point fits into a hole in the bi-metal strip 50 whereby the effective lever arm for the force applied to the bi-metal strip and transmitted to the rockshaft may be manually set. Several holes may be provided whereby screw 57 may be inserted in different positions along the length of the bi-metal element thereby changing its effective length. By changing the setting of the screw 57, the effective lever arm is changed so that the extent of the scale over which pointer 18 moves may be predetermined.

Bi-metal strip 50 is notched as shown at 58 and the bearing surface of the notch is rounded so that upon rotation of screw 55 and rod 53 to set the bi-metal strip in the desired rotated position, there will be little or no movement of the rockshaft due to the reaction of the notched surface and the inverted L-shaped rod 59 connected to the ring 28 on the diaphragm.

The operation of the device as shown in Fig. 7 is as follows: Upon expansion of the diaphragm 27, the rod 59 moves upwardly. This moves the bi-metal strip upwardly which, due to its connection to rockshaft 32, rotates said shaft in a clockwise direction, looking at the bottom end of the rockshaft. The rotation of rockshaft 32 moves long lever 40 to actuate the instrument as was previously set out in the description of Fig. 1.

The action of the bi-metal strip 50 is fundamentally the same as the action of bi-metal rod 30. The strip is mounted parallel to the rockshaft 32 so that upon a change in temperature the strip will bend and the distance from the center of rockshaft 32 to the point of application of rod 59 will change, thereby changing the effective lever arm of the force applied to the rockshaft. Upon rotation of the screw 55 and rod 53 the plane of the bi-metal strip relative to the rockshaft is changed. That is, the angle of the plane of deflection of the bi-metal strip upon change in temperature, is varied by rotating the strip. Hence the amplification due to change of the lever arm may be varied even though the device is to be used through the same temperature range. The actual movement of the bi-metal strip is composed of a combination of the movement due to the expansion of the diaphragm and the changes in flexure of the strip due to changes in temperature as set out in the operation of the bi-metallic rod in the description of Figs. 5 and 6. Likewise by rotating the bi-metal strip by rotation of screw 55, the correction curve of the compensator can be made to balance the error curve of the instrument as in the use of bi-metallic rod 30.

When a freakish error curve occurs in the instrument, the compensating device may, in addition, be used to distribute the errors to locations on the scale where the errors will be the least harmful.

The present compensator accomplishes the result desired within a close degree of accuracy for most of the practical cases in which compensation is needed and it is also versatile enough so that a great variety of different correction curves is available. It is possible to make the point of zero correction occur anywhere within the scale or outside thereof. The corrections may be made either positive or negative over all of the scale or over part of it and may be made to increase or to decrease with scale readings. By rotating the bi-metal element until the constituent metals are reversed a previously positive correction may be made negative or vice versa. The actual shape of the correction curves can be controlled by using different starting angles for the compensating element.

Novel means have therefore been described whereby errors due to changes in temperature are compensated and errors due to a different rate of expansion of a spring element or diaphragm, on different parts of the scale, are likewise compensated.

Although a plurality of embodiments of the invention have been illustrated and described other changes and modifications in form, materials and relative arrangement of parts, which will now appear apparent to those skilled in the art, may be made without departing from the scope of the invention. Reference, therefore, is to be had to the appended claims for a definition of the limits of the invention.

What is claimed is:

1. In a device comprising an expansible element, a rockshaft, means for translating the expansion of said element into rotation of said rockshaft and comprising a thermo-responsive element adjustably connected at one end to said rockshaft and generally parallel thereto, the other end of said element being free to move upon a change of temperature, means for bodily rotating said thermo-responsive element about its own axis whereby the plane of movement of said free end may be oriented with respect to said rockshaft, means transmitting the movement of said expansible element to said free end and means carried by said rock-shaft for predetermining the initial setting of said thermo-responsive element.

2. An indicating instrument comprising an expansible element, a dial, indicating means mounted for movement over said dial, connecting means between said element and said indicating means comprising a rockshaft, thermo-responsive means fastened at one end for rotative adjustment and free at the other end, means for bodily rotating said thermo-responsive means about its own axis whereby the plane of expansion of said free end may be oriented, said expansible means being connected to one end of said thermo-responsive element and said rockshaft at the other end thereof and means to predetermine the initial setting of said thermo-responsive means.

3. A compensating element comprising a bi-metal strip, means resiliently mounting said strip for rotatable adjustment, means for adjusting the orientation of said strip, means for locking said strip in adjusted position, and means for adjusting the initial deflection of said strip.

4. A compensating element comprising, a bi-metal wire, means connected to said wire forming an adjusting lever, means mounting said wire at one end thereof for adjustable rotation about its own axis, said wire being free at the other end thereof, means for locking said wire in position whereby the plane of deflection of said wire can be predetermined and cooperating means for manually deflecting said bi-metal wire to a desired position.

5. In a device comprising an expansible element, a rockshaft, a bi-metal strip responsive to changes in temperature, means mounting said strip in adjustable rotative position at one end thereof, means for bodily rotating said strip about its own axis, means for locking said strip in rotative position whereby its orientation with respect to said expansible element may be predetermined, said strip connecting said expansible element and said rockshaft and ranging means carried by said rock-shaft for initially setting said bi-metal strip.

6. In a device of the character described, an expansible element, a rockshaft, a bi-metal element mounted on said rockshaft at one end thereof and free at the other end thereof, a notch in the free end of said element, one wall of said notch being rounded, means on said element contacting said rounded wall whereby the movement of said element is transmitted to said rockshaft, and means for adjusting the initial deflection of said element.

7. In a device of the character described, an expansible means, means movable in proportion to the expansion of said first means to indicate the degree of said expansion, temperature responsive means between said first and said second means fastened at one end to one of said means and free at the other end and in sliding contact with the other of said means for variation of the motion transmitting ratio, and means for mounting said temperature responsive means for rotation about its own axis whereby the component of movement transmitted by said temperature responsive means may be adjusted.

GEORGE A. TITTERINGTON, Jr.